Patented May 20, 1924.

1,494,698

UNITED STATES PATENT OFFICE.

CHARLES E. NORTH, OF MONTCLAIR, NEW JERSEY, ASSIGNOR TO THE MILK OIL CORPORATION, OF WILMINGTON, DELAWARE, A CORPORATION OF DELAWARE.

CONDENSED-MILK OIL.

No Drawing.   Application filed February 14, 1923.   Serial No. 619,020.

*To all whom it may concern:*

Be it known that I, CHARLES E. NORTH, a citizen of the United States of America, residing at Montclair, in the county of Essex and State of New Jersey, have invented certain new and useful Improvements in Condensed-Milk Oil, of which the following is a full, clear, and exact description.

In all processes heretofore practised for the extraction from milk or cream of the oil or fat, the chief difficulty encountered is due to the presence and close association with the fat globules in the milk or cream of water and the milk solids which cannot be classed in any sense as fat. The serious problem in the recovery of the oil in a substantially pure state in which it is practically imperishable in properly sealed or closed containers, is the removal from the emulsion of the water, and the milk solids not fat, or in general the complete separation of these and the fat globules.

The importance to the milk industry of the conservation of the ingredients entering into the milk has led to the development of numerous processes for effecting this separation and for preserving for indefinite periods the separated ingredients in condition which will permit of their ready re-association when required for use in the condition of milk or cream, and following a long series of investigations of the problems involved in the successful carrying out of such processes I have discovered a process of producing the oil in a pure and imperishable condition which is characterized by extreme simplicity, efficiency and economy.

In carrying out this discovery, I proceed as follows. I first separate the cream from the skim milk by any ordinary but preferably mechanical process such as by the use of a centrifuge. The cream so separated is then thoroughly washed, by which term I mean that a relatively large volume of pure water is added to it and the mixture passed through a centrifugal cream separator. One such washing will not ordinarily suffice, and I therefore repeat this step several times, preferably three times, at the normal temperatures at which cream is usually separated. The product of these washings is an emulsion of milk fat in water containing less than one-tenth of one per cent of the original skim milk.

That this is true will appear from the following considerations and example. If fresh sweet milk with a fat percentage of 3.5% be passed through a centrifugal cream separator operated so as to discharge the skim milk at the appropriate spout and the cream at the other, a cream having a fat percentage of 35% may be obtained. If ten cans of milk be thus treated there will result nine cans of skim milk containing practically no fat, and one can of cream containing 35% fat and 65% skim milk.

If this one can of cream be then diluted with nine cans of pure water the mixture contains the 3.5% fat content of the original milk, but the skim milk will have been diluted more than ten times, hence if this mixture be then passed through the same separator, we will obtain nine cans of diluted skim milk and one can of washed cream containing 35% of fat but only one-tenth of the original skim milk. The repetition of these washings manifestly results in the production of an emulsion in which the proportion of skim milk present is a negligible quantity.

The washings remove not only the skim milk, as this term is ordinarily employed, but all of the milk solids not fat including the casein and other ingredients, and the washed cream may, for all intents and purposes, be regarded as composed only of oil droplets and water.

Having produced this product I subject it to any known and proper process for evaporating out the water and under such conditions of temperatures as will cause the droplets of oil to melt and coalesce, resulting in the production of a substantially pure dry milk oil. Any process which will remove the water without impairing the oil may be employed. Such processes are commonly used for condensing milk, and almost invariably involve the application of a relatively low heat under a vacuum. As typical and illustrative of such processes it may be stated that if a quantity of the properly washed cream in an ordinary glass flask be connected to an air exhaust and placed in water heated to a temperature of about 130°, all the water will, after a time, be carried off leaving a practically clear dry oil in the flask. I do not regard it as necessary to more specifically refer to the many other processes and forms of apparatus used for condensing, evaporating, or drying such substances as milk, for the purpose of removing therefrom the water, any of which may be employed in carrying out this invention.

It will be understood that if the original milk be rich enough to justify it, which is extremely unlikely, the preliminary step of separating out the cream is not strictly necessary. While, therefore, I have made this separation a step in the process claimed, the term cream will be understood as including any milk provided it be of sufficient richness to permit the process to be economically carried out.

If some curds result from small residue of casein and other solids—not fat, these can be removed by filtration of the oil through cotton, flannel, and other common oil filters.

The oil so produced is a valuable commercial article. It may be re-combined with soluble milk powder and water in well known ways to produce milk or cream. If kept in sealed containers it is practically imperishable, and it is highly useful for many purposes.

What I claim is:—

1. The process herein set forth of extracting oil from milk which consists in separating the cream from the skim milk, washing the cream with water to remove the skim milk ingredients, evaporating off the water and then filtering the oil.

2. The process herein set forth of extracting oil from milk which consists in passing the whole milk through a centrifuge to separate out the cream, diluting this cream with water and passing the dilution through a centrifuge to wash out the skim milk ingredients, repeating this step until the proportion of skim milk remaining becomes negligible, and then removing the water from the oil by evaporation.

3. The process of obtaining milk oil from cream which consists in washing the cream with water until the proportion of skim milk becomes negligible, then condensing the oil and water by evaporation to remove the water under such conditions of temperature as will cause the oil droplets to melt and coalesce.

In testimony whereof I hereto affix my signature.

CHARLES E. NORTH.